United States Patent
Wu et al.

(10) Patent No.: US 9,696,608 B2
(45) Date of Patent: Jul. 4, 2017

(54) APPARATUS HAVING A SPRING PLATE CONNECTING WITH 3D CIRCUIT TERMINALS

(71) Applicant: TDK Taiwan Corp., Taipei (TW)

(72) Inventors: Fu Yuan Wu, Taoyuan County (TW); Yi Ho Chen, Taoyuan County (TW); Yu Sheng Li, Taoyuan County (TW)

(73) Assignee: TDK Taiwan, Corp. (TW)

( * ) Notice: Subject to any disclaimer, the term of this patent is extended or adjusted under 35 U.S.C. 154(b) by 91 days.

(21) Appl. No.: 14/565,078

(22) Filed: Dec. 9, 2014

(65) Prior Publication Data

US 2015/0168668 A1    Jun. 18, 2015

(30) Foreign Application Priority Data

Dec. 11, 2013  (TW) .............................. 102145605 A

(51) Int. Cl.
*G03B 13/36* (2006.01)
*G02B 7/08* (2006.01)
(Continued)

(52) U.S. Cl.
CPC ............... *G03B 13/36* (2013.01); *G02B 7/08* (2013.01); *G02B 13/009* (2013.01); *G02B 27/646* (2013.01); *G03B 3/10* (2013.01)

(58) Field of Classification Search
CPC .......... G03B 13/34; G03B 13/36; G03B 3/10; G03B 3/12; G03B 2205/0007–2205/0053; G03B 2205/0069; G02B 7/04; G02B 7/08; G02B 7/09–7/105; G02B 13/0085; G02B 13/009; G02B 27/64; G02B 27/646;
(Continued)

(56) References Cited

U.S. PATENT DOCUMENTS

| | | |
|---|---|---|
| 7,881,598 B1 * | 2/2011 | Wu .......................... G03B 3/10 396/133 |
| 2006/0239671 A1 | 10/2006 | Shiraishi et al. |
| 2015/0355432 A1 * | 12/2015 | Kasuga .............. H02K 41/0356 359/824 |

FOREIGN PATENT DOCUMENTS

| | | |
|---|---|---|
| CN | 101666900 | 3/2010 |
| CN | 102062926 | 5/2011 |
| | (Continued) | |

OTHER PUBLICATIONS

Office Action dated Aug. 24, 2016 (with English summary) for corresponding China Application No. 201410748266.4.
(Continued)

*Primary Examiner* — Derek S Chapel
*Assistant Examiner* — Adam W Booher

(57) ABSTRACT

An apparatus having a spring plate connecting with 3D circuit terminals comprises a base having a top surface and a thickness surface. At least one bulged plane is formed on a predetermined location of the top surface. A side surface of the bulged plane is declined from inside to outside. At least one extending end is formed on the thickness surface of the base, by corresponding to and extending toward a direction opposite to the bulged plane. A declined surface is formed on an outer side of the extending end, by extending and declining from top to bottom and also from inside to outside. At least one metal layer is formed on the bulged plane and the declined surface by means of 3D electroplating in order to form a circuit connecting the terminals and the spring plate.

10 Claims, 8 Drawing Sheets

(51) Int. Cl.
      *G02B 13/00*       (2006.01)
      *G02B 27/64*       (2006.01)
      *G03B 3/10*       (2006.01)

(58) Field of Classification Search
      CPC ............. H04N 5/2254; H04N 5/23264; H04N 5/2328; H04N 5/23287
      See application file for complete search history.

(56) References Cited

FOREIGN PATENT DOCUMENTS

| | | |
|---|---|---|
| CN | 102411188 | 4/2012 |
| CN | 102681133 | 9/2012 |
| CN | 202472098 | 10/2012 |
| CN | 202615021 | 12/2012 |
| JP | 2002-151546 | 5/2002 |
| JP | 2009-14890 | 1/2009 |
| JP | 2010-109550 | 5/2010 |
| JP | 2011-128583 | 6/2011 |
| JP | 2012-68275 | 4/2012 |
| JP | 2013-120248 | 6/2013 |
| TW | M400000 | 3/2011 |

OTHER PUBLICATIONS

Office Action dated Nov. 26, 2014 (with English summary) for corresponding Taiwan Application No. 102145605.
Office Action dated Jan. 5, 2016 (with English summary) for corresponding Japan Application No. 2014-249560.

\* cited by examiner

APPARATUS HAVING A SPRING PLATE CONNECTING WITH 3D CIRCUIT TERMINALS

This application claims the benefit of Taiwan Patent Application Serial No. 102145605, filed Dec. 11, 2013, the subject matter of which is incorporated herein by reference.

BACKGROUND OF INVENTION

1. Field of the Invention

The invention relates to an apparatus having a spring plate connecting with 3D circuit terminals, and more particularly to the apparatus that applies laser engraving or etching technology to electroplate at least one 3D circuit terminal on a base so as to connect electrically with a spring plate.

2. Description of the Prior Art

With recent progress in manufacturing technology, the size of digital cameras is considerably reduced. In almost all of various mini electronic devices such as mobile phones, the digital image-capturing is one of basic built-in functions. Such a trend is mostly attributed to the miniaturization of the lens module. i.e. the appearance of the micro lens sets. The voice coil motor (VCM), as one of the popular micro lens sets, applies a coil magnet and a spring plate to carry a lens unit to move back and forth along an optical image-capturing axis and so as to achieve purposes of auto focusing or zooming. Further, the high-end digital camera to provide superior image quality and imaging capability such as 10-megapixel and anti-shaking appears and rapidly becomes the trend of the market.

The aforesaid spring plate for carrying the lens module can further introduce a plurality of terminals to establish, by soldering, electrically and signally connection with the coil and/or the control unit. In the art, the terminals for the conventional micro lens sets are manufactured by performing stamping, bending and cutting upon a conductive metal plate. The terminals can then be positioned onto a predetermined location on a base of the lens unit of the micro lens set and at a position corresponding to respective solder points at the spring plate. By applying soldering or dispensing, the spring plate and the terminals can be integrated so as to provide the spring plate capable of external electric connection for forwarding signals or electricity. The conventional manufacturing process for integrating the terminals and the spring plate are complicate and tedious, and can't be executed by auto equipment. Therefore, substantial laboring, time and cost for such a foregoing manufacturing process are inevitable.

Accordingly, in view of the aforesaid disadvantages in applying the conventional terminals, the present invention discloses an apparatus having a spring plate connecting with 3D circuit terminals, which applies laser engraving or etching process to carve or form a preset number of wiring areas at predetermined locations on the base of the micro lens set. Each of the wiring areas is electroplated to form a metal layer having a bulged plane of terminals. Through soldering between the spring plate and the bulged plane, an electric connection in between can be established. Thereby, the conventional work in cutting and mounting the terminals to the base can be considerably reduced, and thus automatic production and cost down can then be possible.

SUMMARY OF THE INVENTION

Accordingly, it is the primary object of the present invention to provide apparatus having a spring plate connecting with 3D circuit terminals, in which at least one wiring area is formed on a base by laser engraving or etching. Then, the electroplating is applied to each the wiring area so as to form thereon at least one terminal. Thereby, the base and the spring plate can be integrated by automatic soldering or welding processes, and thus the process time and the labor cost can be substantially reduced.

In the present invention, the apparatus having a spring plate connecting with 3D circuit terminals includes a base having a top surface and a thickness surface. The top surface further has a predetermined location mounted with at least one bulged plane. The bulged plane has a protrusive side surface declined from inside to outside. On the thickness surface of the base, at least one extending end is constructed in correspondence to, but extended toward a direction opposite to, the bulged plane. One outer side of the extending end has a declined surface extending and declining from top to bottom and also from inside to outside. Through an electroplating process, a metal layer for forming thereon at least one terminal is coated onto a connecting surface covering both the bulged plane of the base and the declined surface of the extending end. Further, through a soldering or welding process, the terminal/terminals and a spring plate fixed on the top surface of the base are electrically connected.

All these objects are achieved by the apparatus having a spring plate connecting with 3D circuit terminals described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an apparatus having a spring plate connecting with 3D circuit terminals. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
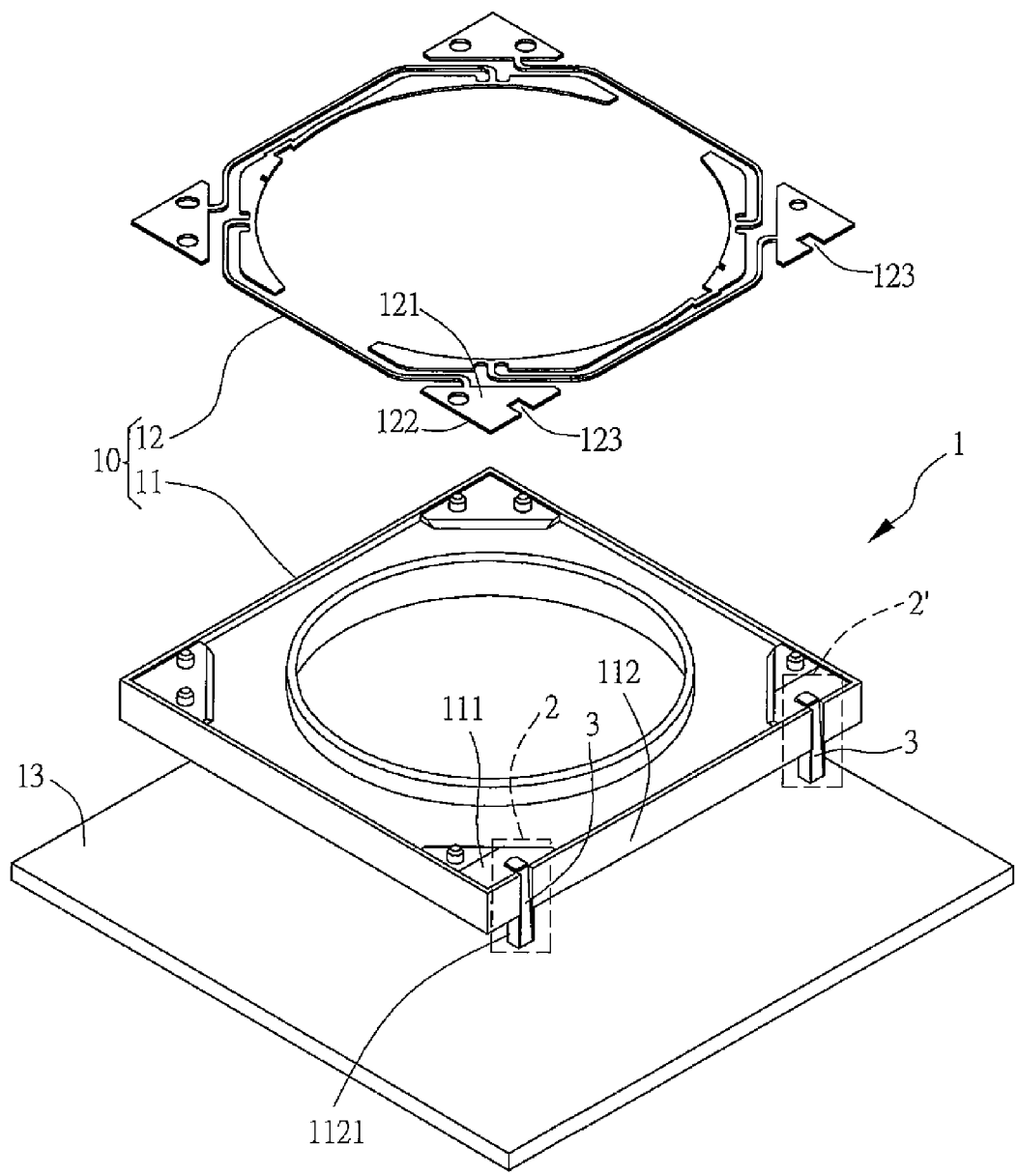
FIG. 1 is a schematic exploded view of an apparatus having a spring plate connecting with 3D circuit terminals in accordance with the present invention.
Figure 2:
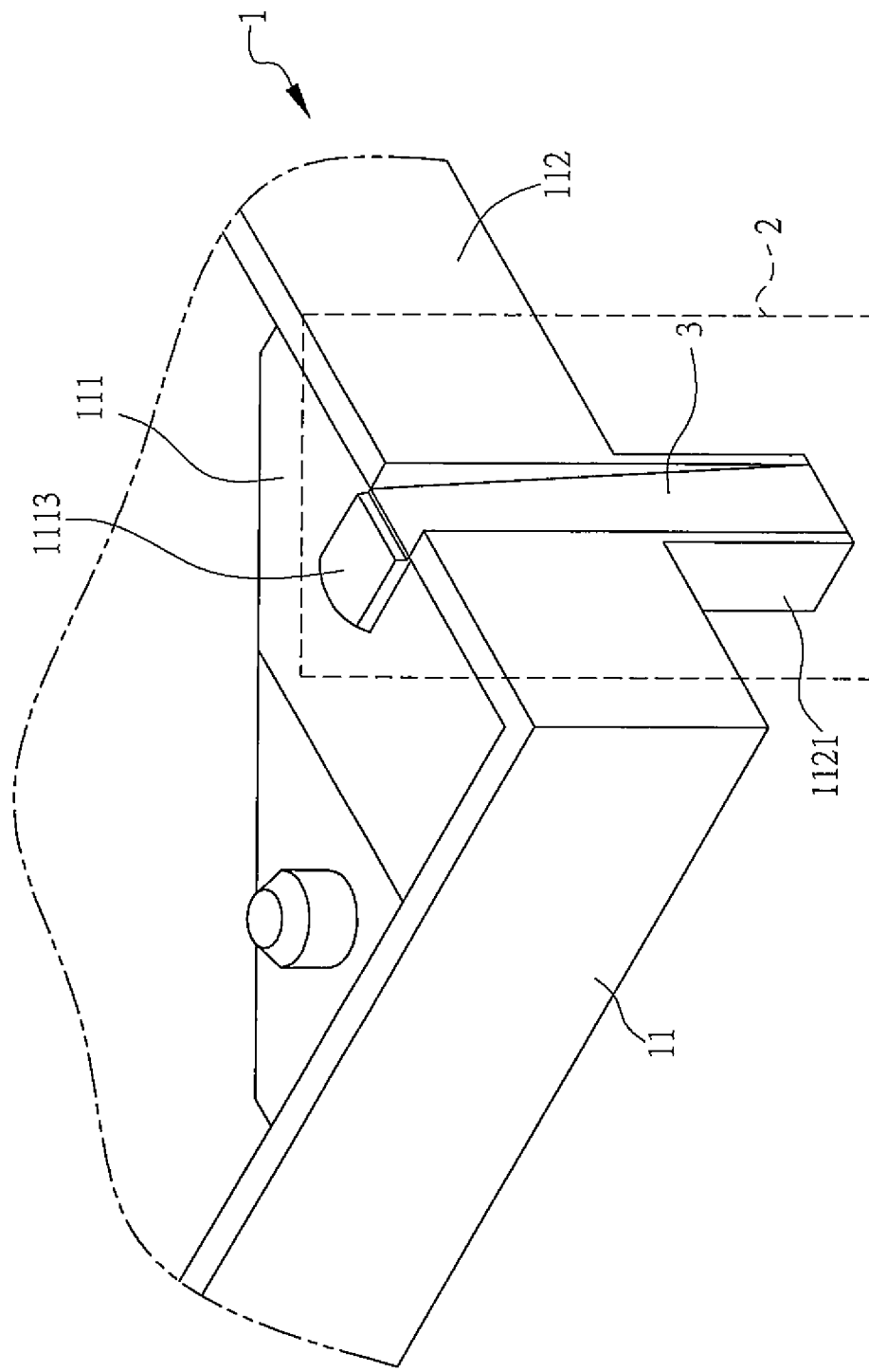
FIG. 2 is a schematic enlarged view of a portion of FIG. 1.
Figure 3:
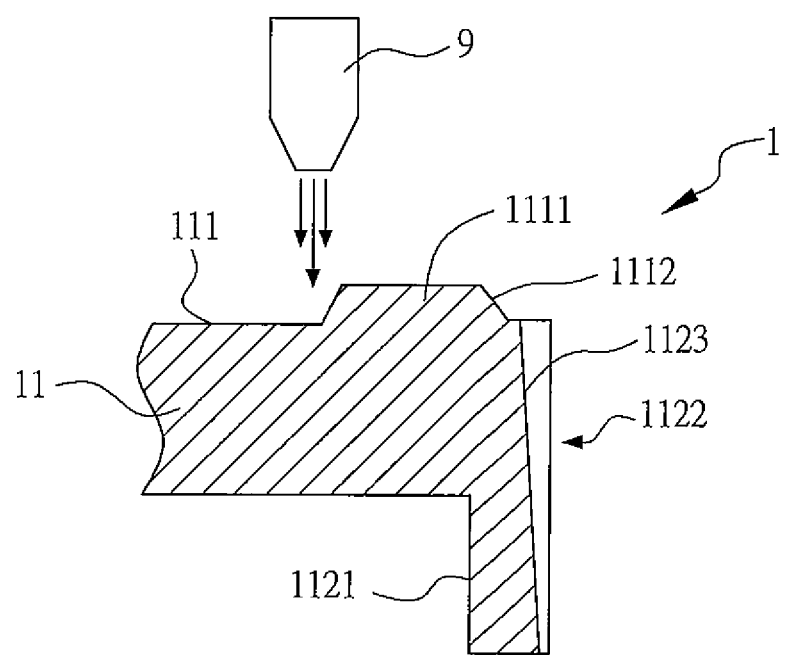
FIG. 3 shows schematically a laser work for the base of the apparatus having a spring plate connecting with 3D circuit terminals in accordance with the present invention.
Figure 4:
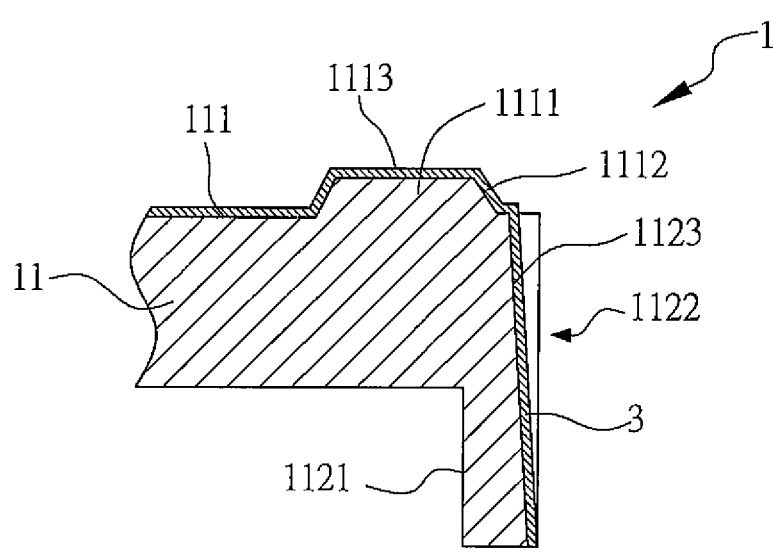
FIG. 4 shows schematically the 3D plating layer of the base of the apparatus having a spring plate connecting with 3D circuit terminals in accordance with the present invention.
Figure 5:
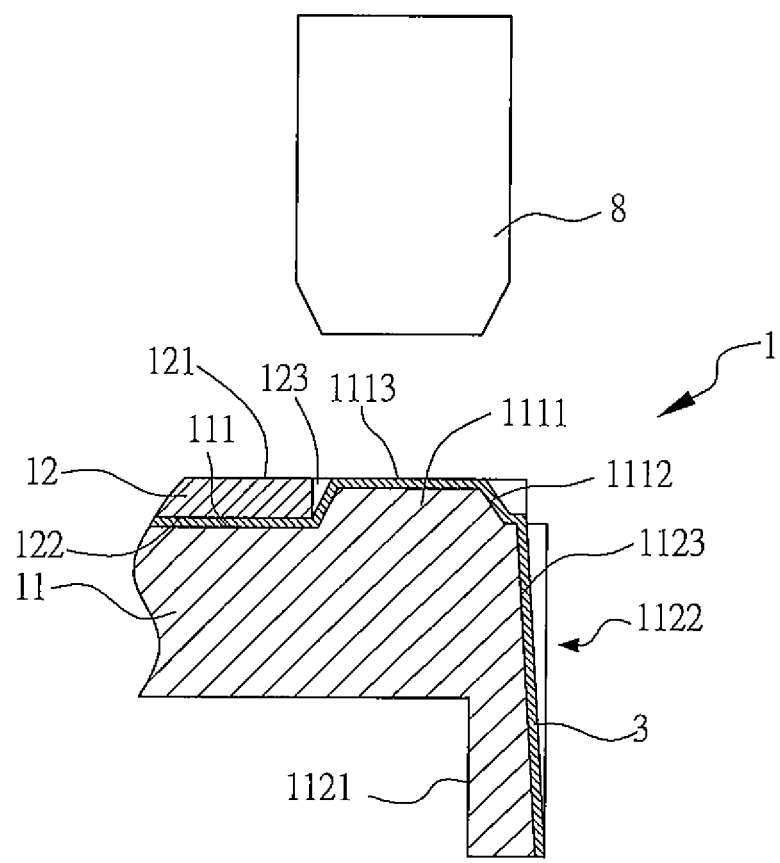
FIG. 5 shows schematically the soldering or welding work for the base and the spring plate of the apparatus having a spring plate connecting with 3D circuit terminals in accordance with the present invention.

Refer to FIG. 1, FIG. 2, FIG. 3, FIG. 4 and FIG. 5; in which FIG. 1 is a schematic exploded view of the apparatus having a spring plate connecting with 3D circuit terminals in accordance with the present invention. FIG. 2 is a schematic enlarged view of the dashed-line portion of FIG. 1. FIG. 3 shows schematically a laser work for the base of the apparatus having a spring plate connecting with 3D circuit terminals in accordance with the present invention. FIG. 4 shows schematically the 3D plating layer of the base of the apparatus having a spring plate connecting with 3D circuit terminals in accordance with the present invention, and FIG. 5 shows schematically the soldering or welding work for the base and the spring plate of the apparatus having a spring plate connecting with 3D circuit terminals in accordance with the present invention.

In the present invention, the apparatus having a spring plate connecting with 3D circuit terminals 1 is worked by a laser head 9 for performing the laser engraving and/or etching process, and also a 3D electroplating process is also applied to micro lens set 10 so as to form at least one terminal 3. The micro lens set 10 further includes a base 11 and at least one spring plate 12. The base 11 further having a top surface 111 and a thickness surface 112 includes at least one predetermined location for forming correspondingly at least one wiring area 2 by laser engraving and etching (two 2, 2' shown in the FIG. 1). During the laser engraving and etching process, the laser head 9 for working on the wiring area 2 or 2' is fed in a direction perpendicular to the top surface 111 of the base 11. In the preferred embodiment of the present invention, the base 11 includes two wiring areas 2 and 2' located at opposing ends of the same side surface of the base 11. Each of the wiring areas 2 and 2' includes a bulged plane 1111 and an extending end 1121. After the laser head 9 processes the laser engraving and etching, the bulged plane 1111 formed protrusive at the predetermined location of the top surface 111 of the base 11 has opposing side surfaces 1112 declined in a slope manner with respect to the base 11. The extending end 1121 is protruded along the thickness surface 112 and is extended to adjoin one side of the bulged plane 1111. On one outer side 1122 of the extending end 1121, a declined surface 1123 is formed by the laser engraving and etching to extend and decline from top to bottom and also from inside to outside with respect to the base 11.

In each of the wiring areas 2 and 2', by having respective slope arrangement to the side surface 1112 of the bulged plane 1111 and the declined surface 1123 of the extending end 1121, the laser head 9 can then complete its carving work of the laser engraving and etching upon the wiring areas 2 and 2' in a simple front feeding manner. Also, the follow-up 3D electroplating process upon the wiring areas 2 and 2' can be easily performed to deposit a layer of metal for forming the respective terminals 3. Namely, as illustrated, on the base 11, the surface of the bulged plane 1111 including the side surfaces 1112 and the declined surface 1123 of the extending end 1121 are connected integrally to form a continuous electroplating surface so that a metal layer can be electroplated thereon so as to form the respective terminal 3 adhered to the surface of the base 11. Therefore, a spring plate 12 mounted on the top surface 111 of the base 11 can be welded or soldered onto the base 11 at the terminals 3 by a welding or soldering head 8, such that an electrical connection between the terminals 3 and the spring plate 12 can be established.

In the present invention, the spring plate 12 further includes a top surface 121 and a bottom surface 122. At a predetermined location on the spring plate 12, at least one connection aperture 123 is formed in correspondence to the bulged plane 1111 of the base 11. Hence, while the bottom surface 122 of the spring plate 12 is fixed onto the top surface 111 of the base 11, the bulged plane 1111 coated by the metal layer is to be fit into the respective connection aperture 123 of the spring plate 12 in a manner of flushing the top surface 121 of the spring plate 12 and the top surface 1113 of the bulged plane 1111 coated the metal layer. Further, the connection aperture 123 and the circuited metal layer of the bulged plane 1111 are connected firmly and electrically by the welding head 8, such that the spring plate 12 and the terminals 3 can be electrically connected. In the present invention, the spring plate 12 can be made from a conductive and elastic metal plate produced by a punch or etching process.

Figure 6:
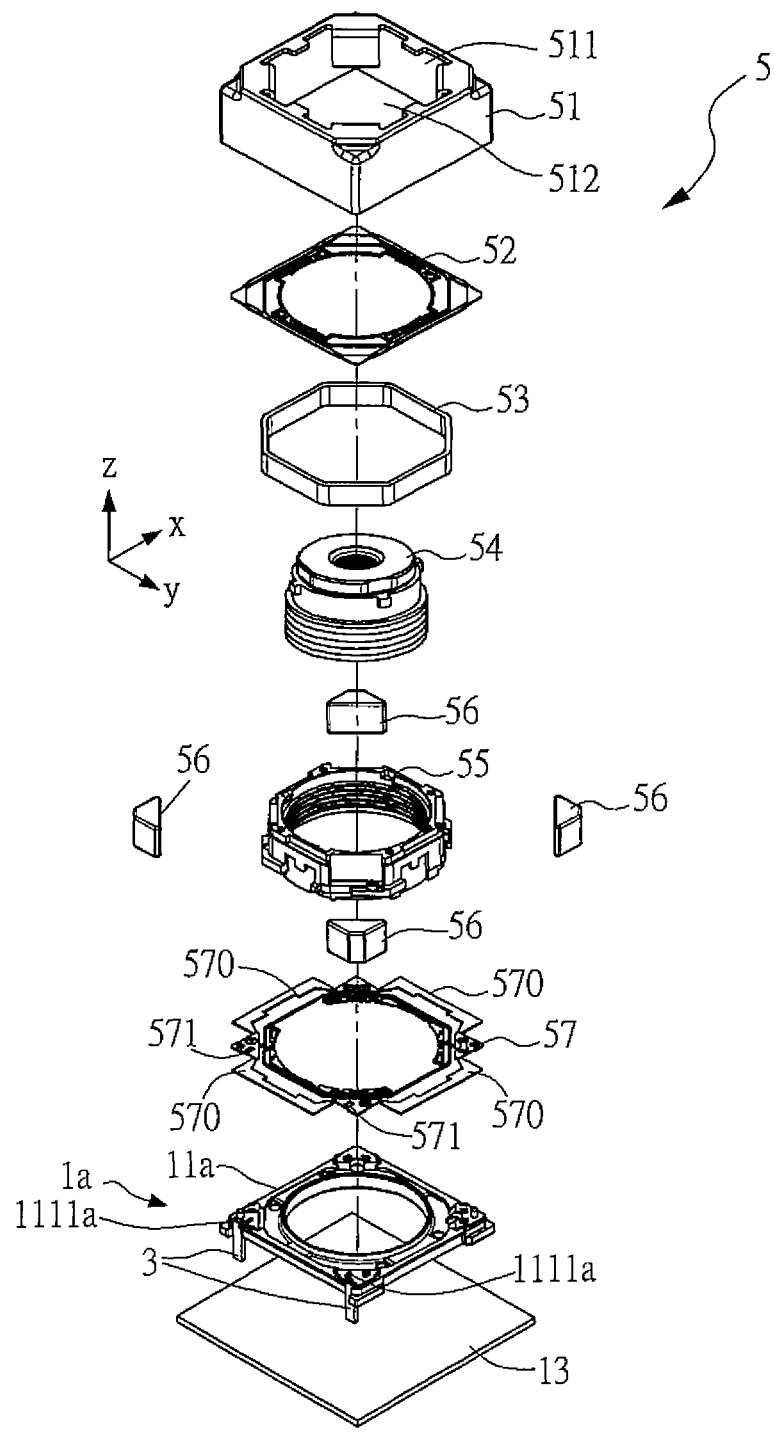
FIG. 6 is a schematic exploded view of a first embodiment of the apparatus having a spring plate connecting with 3D circuit terminals in accordance with the present invention, which is applied to a VCM micro lens set.

In the present invention, the base 11 of the apparatus having a spring plate connecting with 3D circuit terminals 1 can be made of plastics. The electroplated terminals 3 formed by the metal layer on the declined surface 1123 of the extending end 1121 of the base 11 can be further electrically connected with a circuit board 13, and then electric currents can flow from the circuit board 13 to a coil 53 via the spring plate 12. By energizing the coil, an electromagnetic field can be formed to act against the magnets 56, as shown in FIG. 6, such that the micro lens set 10 can perform focusing and/or zooming. For the voice coil motor (VCM) technology has been widely applied to the micro lens set, in which the coil magnets and the spring plate are paired to drive electromagnetically the micro lens set to undergo focusing and/or zooming, details thereabout are omitted herein.

In the following embodiments of the present invention, for most of the elements thereof are identical or at least similar to those of the aforesaid embodiment, details for those identical and similar elements are omitted. Further, the same names and numbers would be assigned to those identical elements, but a tailing letter would be assigned to any of those similar elements though still by the same names.

Referring now to FIG. 6, a first embodiment 1a of the apparatus having a spring plate connecting with 3D circuit terminals in accordance with the present invention is shown explodedly, in which the apparatus is applied to a VCM micro lens set 5. The apparatus having a spring plate connecting with 3D circuit terminals 1a is defined by an X-Y-Z coordinate system. The VCM micro lens set 5 includes a casing 51, an upper spring plate 52, a coil 53, a lens unit 54, a lens carrier 55, a plurality of magnetic members 56, and a lower spring plate 57. The lens unit 54 is located inside the lens carrier 55. The coil 53 is wound outside the lens carrier 55 at positions in corresponding to the magnetic members 56 arranged on an interior wall 511 of the casing 51. The lens carrier 55 is elastically clamped in between by the upper spring plate 52 and the lower spring plate 57 in an accommodation room 512 inside the casing 51. In this first embodiment, the magnetic members 56 can be permanent magnets.

At the outer rim of the lower spring plate 57, a plurality of connecting flanges 570 are included, and these connecting flanges 570 are to be properly cut away after the lower spring plate 57 is assembled in position. At predetermined locations of the lower spring plate 57, at least one connection aperture 571 is constructed in correspondence with the bulged plane 1111a of the base 11a. While the lower spring plate 57 is buckled to the base 11a, the bulged plane 1111a coated thereon by an electroplated metal layer is fit into the respective connection aperture 571 of the lower spring plate 57, and then the welding head 8 is introduced to weld integrally the lower spring plate 57 and the terminals 3 so as to establish the electrical connection in between, as shown in FIGS. Thus, the electric signal of the circuit board 13 connected with the terminals 3 can be forwarded to the coil 53 via the lower spring plate 57, such that the coil 53 can be energized to induce an electromagnetic field to react with the corresponding magnetic members 56. Thereby, the lens carrier 55 carrying the lens unit 54 can undergo a Z-axial displacement inside the accommodation room 512 of the casing 51 so as to perform focusing and/or zooming for the VCM micro lens set 5.

Figure 7:
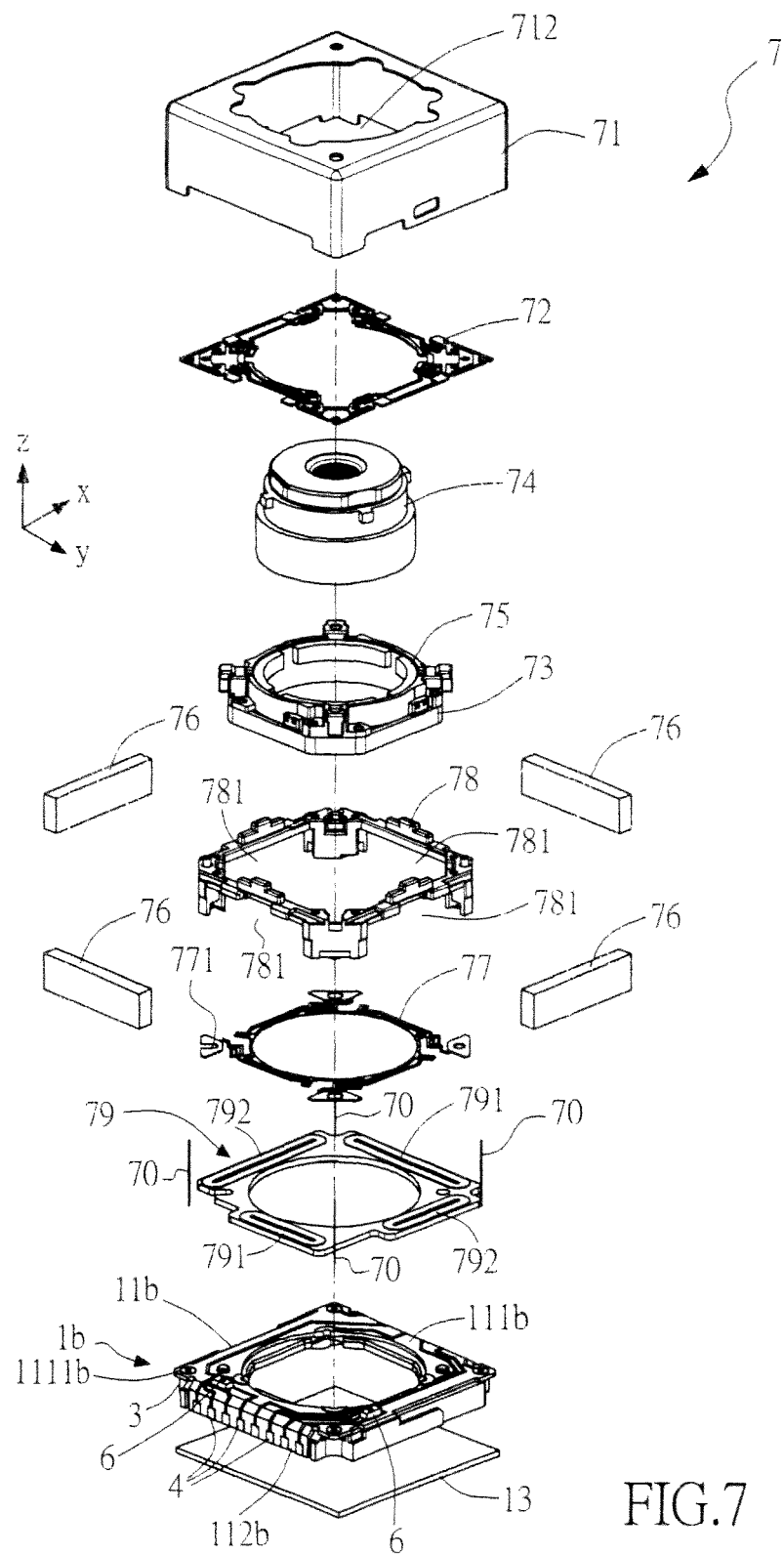
FIG. 7 is a schematic exploded view of a second embodiment of the apparatus having a spring plate connecting with 3D circuit terminals in accordance with the present invention, which is applied to an OIS optical anti-shake system.

Referring now to FIG. 7, a second embodiment 1b of the apparatus having a spring plate connecting with 3D circuit terminals in accordance with the present invention is shown explodedly, in which the apparatus is applied to an OIS optical anti-shake system 7. Also shown in FIG. 8, an assembled state of FIG. 7 is present. In this second embodiment, the apparatus having a spring plate connecting with 3D circuit terminals 1b applied to the OIS optical anti-shake system 7 is defined by an X-Y-Z coordinate system, and the OIS optical anti-shake system 7 includes a casing 71, an upper spring plate 72, a coil 73, a lens unit 74, a lens carrier 75, a plurality of magnetic members 76, a lower spring plate 77, a position member 78, a compensation circuit module 79 and a plurality of suspension mechanisms 70.

The lens unit 74 is mounted inside the lens carrier 75. The coil 73 is wound outside the lens carrier 75. The plurality of the magnetic members 76 are mounted to the position member 78 at the respective receiving spaces 781 in a position manner of corresponding to the respective coil 73 outside the lens carrier 75. In this embodiment, the magnetic member 76 can be a permanent magnet. The lens carrier 75 is elastically clamped in the Z-axial direction by the upper spring plate 72 and the lower spring plate 77. Further through the suspension mechanisms 70 and the position member 78, the lens carrier 75 can be elastically located above the base 11b and suspended inside the accommodation room 712 of the casing 71. The compensation circuit module 79 is located above the top surface 111b of the base 11b so as to provide a driving force to the base 11b for compensating the X-axial and the Y-axial displacements. In this embodiment, the compensation circuit module 79 can further include two Y-axis driving coils 791 and two X-axis driving coils 792, in which the Y-axis driving coils 791 and the X-axis driving coils 792 are positioned respective to the corresponding magnetic members 76. Namely, by providing the Y-axis and the X-axis driving coils 791,792 of the compensation circuit module 79, the respective magnetic members 76 can then be electromagnetically driven so as to properly compensate the shake-induced displacement biases of the lens carrier 75 in either direction of the Z axis and the Y axis.

Figure 8:
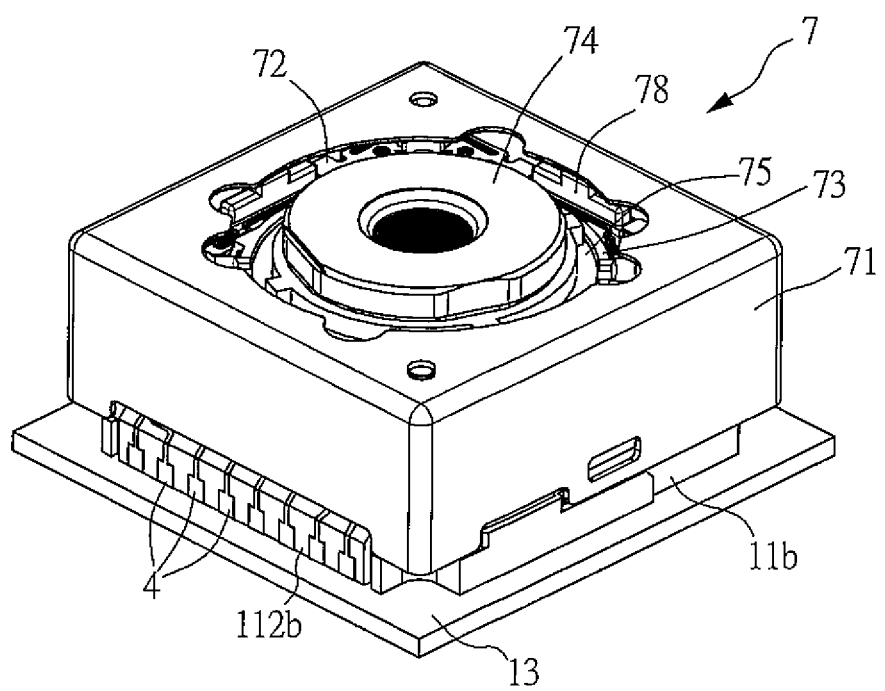
FIG. 8 is a schematic assembled state of FIG. 7.

The second embodiment of the apparatus having a spring plate connecting with 3D circuit terminals 1b can further include a plurality of terminals 4 and at least one position sensor 6 (two shown in this embodiment). The terminals 4 are also electroplated in a 3D circuit manner onto the base 11b, and extended from the thickness surface 112b to the top surface 111b. The two position sensors 6 are mounted respectively to the X axis and Y axis of the top surface 111b of the base 11b and electrically connected with the terminals 4 so as to detect the electromagnetic variations upon the magnetic members 76. Also, through the electrical connection between the terminals 4 and the circuit board 13, detection signals of these two position sensors 6 can be forwarded to the compensation circuit module 79 for compensating biases of the lens unit 74 caused by the shake in either the X-axial and Y-axial directions. In addition, portion of the terminals 4 that extend to the top surface 111b of the base 11b can be electrically connected with the compensation circuit module 79. As shown in FIG. 8, in the second embodiment 1b of the present invention, the terminals 4 are arranged at the same side of the thickness surface 112b of the base 11b and, in the assembled state, exposed outside the casing 71 for providing any possible foreign connection. These terminals 4 can be made of a conductive metal and produced by 3D circuit electroplating and etching. At predetermined locations on the lower spring plate 77, at least one connection aperture 771 is constructed in correspondence with the respective bulged plane 1111b of the base 11b so as to perform the buckling between the lower spring plate 77 and the base 11b.

Namely, the conventional art is to introduce an additional flexible circuit board FPC to connect electrically the coils 791-794 of the compensation circuit module 79, but, in the present invention, the 3D circuiting pattern is introduced to substitute the flexible circuit board FPC, such that the labor and cost for manufacturing the apparatus can be substantially reduced.

In summary, the apparatus having a spring plate connecting with 3D circuit terminals 1 in accordance with the present invention includes at least one terminal 3 on the micro lens set 10 by having a laser head 9 to perform laser engraving, etching and 3D circuiting thereupon. The micro lens set 10 includes a base 11 and at least one spring plate 12. The base 11 further includes a top surface 111 and a thickness surface 112. At least one bulged plane 1111 is formed at the predetermined location on the top surface 111 of the base 11, in which the bulged plane 1111 has a slope side surface 1112 declined from inside to outside. Also, on the thickness surface 112 of the base 11, at least one extending end 1121 is extended along a direction leaving the bulged plane 1111. An outer side 1122 of the extending end 1121 has a declined surface 1123 extending and declining from top to bottom and also from inside to outside with respect to the base 11.

By introducing the 3D electroplating process to coat a metal layer (for forming the terminals 3) onto the bulged plane 1111 of the base 11 and the declined surface 1123 of the extending end 1121, and further by introducing a welding head 8 for welding or soldering to electrically connect the terminals 3 and the spring plate 12 fixed on the top surface 111 of the base 11, the apparatus having a spring plate connecting with 3D circuit terminals of the present invention can have at least advantages in (1) reducing the labor for forming the terminals. (2) feasibility of an automatic process, and (3) waiving the conventional leads and flexible circuit board FPC for connection.

While the present invention has been particularly shown and described with reference to a preferred embodiment, it will be understood by those skilled in the art that various changes in form and detail may be without departing from the spirit and scope of the present invention.

What is claimed is:

1. An apparatus having a spring plate connecting with three-dimensional (3D) circuit terminals, comprising:

a base further including a top surface and a thickness surface, at least one bulged plane being formed at a predetermined location on the top surface, the bulged plane having a slope side surface, the thickness surface having at least one extending end extended along a direction leaving the bulged plane, an outer side of the extending end having a declined surface extending and declining from top to bottom and also from inside to outside with respect to the base;

wherein a 3D circuit process is applied to form a continuous electroplated metal layer on a top surface and a side surface of the bulged plane and the declined surface of the extending end for further forming at least one terminal;

wherein a welding process is applied to electrically connect the at least one terminal and a spring plate fixed on the top surface of the base;

wherein the spring plate further includes at least one connection aperture in correspondence with the respective bulged plane of the base; wherein, while the spring plate is fixed to the top surface of the base, the bulged plane coated by the electroplated metal layer is fit to the respective connection aperture of the spring plate, and the connection aperture and the electroplated metal layer on the bulged plane are welded or soldered together so as to electrically connect the spring plate and the at least one terminal; and wherein, when the bulged plane is fit to the respective connection aperture of the spring plate, a top of the spring plate is flush with the top surface of the bulged plane coated by the electroplated metal layer.

2. The apparatus having a spring plate connecting with 3D circuit terminals of claim 1, wherein the bulged plane of the base and the declined surface of the extending end are located in a wiring area, wherein the bulged plane of the base and the declined surface of the extending end are formed by laser engraving and etching.

3. The apparatus having a spring plate connecting with 3D circuit terminals of claim 2, wherein the base has two wiring areas located oppositely on a side surface of the base.

4. The apparatus having a spring plate connecting with 3D circuit terminals of claim 1, wherein the spring plate is made from a conductive and elastic metal plate produced by a punch or etching process.

5. The apparatus having a spring plate connecting with 3D circuit terminals of claim 1, wherein the terminal located on the declined surface of the extending end is electrically connected with a circuit board so as to have a current of the circuit board to be forwarded to a coil via the spring plate for energizing the coil to generate an electromagnetic field.

6. The apparatus having a spring plate connecting with 3D circuit terminals of claim 1, wherein the base comprises a plastic material.

7. The apparatus having a spring plate connecting with 3D circuit terminals of claim 1, mounted on a voice coil motor (VCM) micro lens set, the VCM micro lens set further including a casing, an upper spring plate, a coil, a lens unit, a lens carrier, a plurality of magnetic members, and a lower spring plate, the lens unit being located inside the lens carrier, the coil being wound outside the lens carrier at positions in corresponding to the magnetic members arranged on an interior wall of the casing, the lens carrier being elastically clamped in between by the upper spring plate and the lower spring plate in an accommodation room inside the casing, the lower spring plate having at least one connection aperture respective to the bulged plane of the base; wherein, while the lower spring plate is fixed to the base, the bulged plane coated by the electroplated metal layer is fit into the respective connection aperture of the lower spring plate, then the connection aperture and the electroplated metal layer on the bulged plane are welded or soldered together so as to electrically connect the lower spring plate and the terminal.

8. The apparatus having a spring plate connecting with 3D circuit terminals of claim 1, mounted on an optical image stabilization (OIS) optical anti-shake system, the OIS optical anti-shake system further including a compensation circuit module located above the top surface of the base for providing a driving force to compensate displacement biases thereof, the base further having a plurality of terminals in a 3D circuit manner, each of the plurality of terminals being extended from the thickness surface to the top surface and connected electrically with the compensation circuit module.

9. The apparatus having a spring plate connecting with 3D circuit terminals of claim 8, wherein the OIS optical anti-shake system further includes a casing, an upper spring plate, a coil, a lens unit, a lens carrier, a plurality of magnetic members, a lower spring plate, a position member and a plurality of suspension mechanisms, the lens unit being located inside the lens carrier, the coil being wound outside the lens carrier, the plurality of magnetic members being fit to respective receiving spaces of the position member and in positions corresponding to the respective coil outside the lens carrier, the lens carrier being elastically clamped in a Z-axial direction by the upper spring plate and the lower spring plate, the lens carrier being elastically located above the base and suspended inside another accommodation room of the casing via the suspension mechanisms and the position member, the compensation circuit module being located above the top surface of the base, the compensation circuit module further including two Y-axis driving coils and two X-axis driving coils, the Y-axis driving coils and the X-axis driving coils being positioned respective to the corresponding magnetic members, the lower spring plate further having at least one connection aperture respective to the bulged plane of the base so as able to have the lower spring plate to be buckled to the base.

10. The apparatus having a spring plate connecting with 3D circuit terminals of claim 9, further including at least one position sensor for detecting electromagnetic variations of the magnetic members, the at least one position sensor being located on the top surface of the base and electrically connected with the terminals.

* * * * *